(12) United States Patent
Homma et al.

(10) Patent No.: US 10,162,108 B2
(45) Date of Patent: Dec. 25, 2018

(54) OPTICAL FIBER

(71) Applicant: SUMITOMO ELECTRIC INDUSTRIES, LTD., Osaka-shi, Osaka (JP)

(72) Inventors: Yuya Homma, Yokohama (JP); Kazuyuki Sohma, Yokohama (JP); Kensaku Shimada, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 15/717,016

(22) Filed: Sep. 27, 2017

(65) Prior Publication Data

US 2018/0095221 A1    Apr. 5, 2018

(30) Foreign Application Priority Data

Oct. 3, 2016  (JP) ................. 2016-195651

(51) Int. Cl.
*G02B 6/02* (2006.01)
*G02B 6/036* (2006.01)
*C03C 25/10* (2018.01)
*C03C 25/1065* (2018.01)

(52) U.S. Cl.
CPC ...... *G02B 6/02395* (2013.01); *C03C 25/1065* (2013.01); *G02B 6/03694* (2013.01)

(58) Field of Classification Search
CPC .................... G02B 6/02395; G02B 6/03694
See application file for complete search history.

(56) References Cited

U.S. PATENT DOCUMENTS

| | | | | |
|---|---|---|---|---|
| 8,338,081 | B2* | 12/2012 | Yamada | C08F 299/0435 430/280.1 |
| 2015/0131956 | A1* | 5/2015 | Iwaguchi | C03C 25/1065 385/128 |

FOREIGN PATENT DOCUMENTS

| | | |
|---|---|---|
| JP | 2014-95923 A | 5/2014 |
| JP | 2014-132075 A | 7/2014 |

* cited by examiner

*Primary Examiner* — Ryan Lepisto
(74) *Attorney, Agent, or Firm* — Drinker Biddle & Reath LLP

(57) ABSTRACT

An optical fiber includes an optical transmission medium having a core and a cladding, a primary resin layer disposed in contact with the optical transmission medium to coat the optical transmission medium, and a secondary resin layer coating the primary resin layer, wherein a Young's modulus of the primary resin layer is 0.5 MPa or less at 23° C., and the primary resin layer comprises a cured product of an ultraviolet light curable resin composition containing a urethane (meth)acrylate oligomer, a monomer, a photopolymerization initiator and a β-diketone compound, and tin.

5 Claims, 2 Drawing Sheets

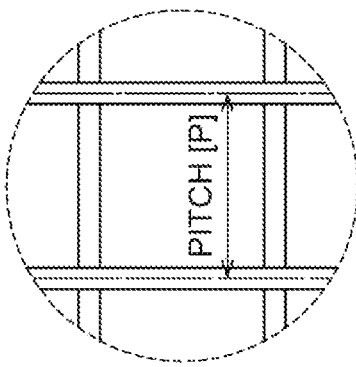
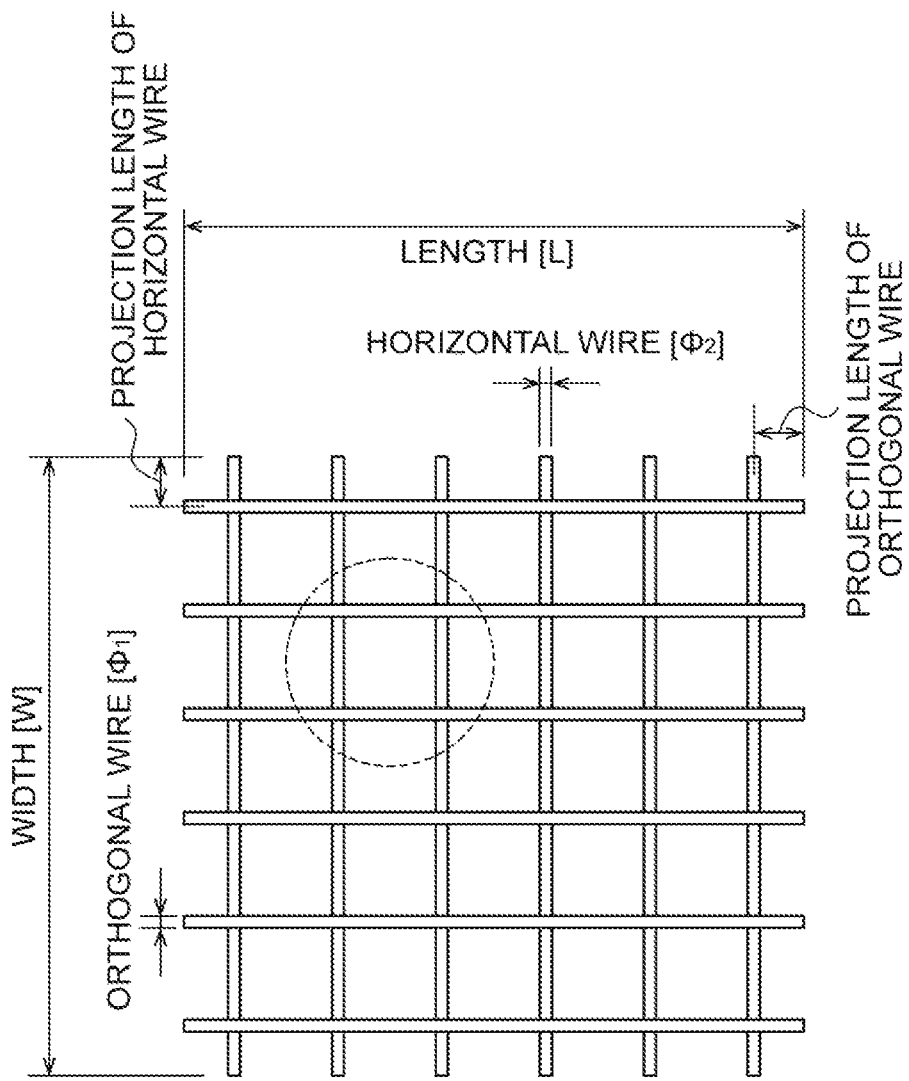

OPTICAL FIBER

TECHNICAL FIELD

The present invention relates to optical fibers.

This application claims a priority based on Japanese Patent Application No. 2016-195651 filed on Oct. 3, 2016, and the entire content described in the Japanese Patent Application is incorporated.

BACKGROUND

Optical fibers generally include coating resin layers for protecting glass fibers which are optical transmission media. For example, JP 2014-132075 A and JP 2014-95923 A describe resin compositions for coating optical fibers containing urethane (meth)acrylate oligomers. Moreover, an organic tin catalyst is used as a catalyst for synthesizing a urethane (meth)acrylate oligomer.

SUMMARY

To minimize an increase in transmission loss induced by micro bend generated when lateral pressure is applied to optical fibers, lateral pressure resistance has been required for the optical fibers. Moreover, in the case where the coating resin layer has a primary resin layer coating an optical transmission medium and a secondary resin layer coating the primary resin layer, a reduction in Young's modulus of the primary resin layer is required to improve the lateral pressure resistance.

Here, the organic tin catalyst, which is a catalyst for synthesizing a urethane (meth)acrylate oligomer, may be mixed with the resin composition used to form the coating resin layer. For this reason, a slight amount of tin derived from the organic tin catalyst is contained in the coating resin layer formed by curing the resin composition. In the case where tin is contained in the coating resin layer, tin also acts as a hydrolysis catalyst for urethane bond and ester bond under a hygrothermal environment to facilitate the progression of degradation of the coating resin layer. Moreover, because the crosslinking density of the cured resin composition in a primary resin layer having a low Young's modulus is lower than that of conventional resin compositions, the moisture readily attacks the cured resin composition, further facilitating hydrolysis. Thus, the crosslinks are broken unevenly in the primary resin so that stress concentrates in a point, and defects such as voids are generated in the coating resin layer. The sizes of such voids will increase at low temperatures to generate micro bends in the optical transmission medium, and the transmission loss will tend to increase.

Then, an object of the present invention is to provide an optical fiber having a low Young's modulus leading to high lateral pressure resistance, enabling prevention of the generation of voids even if the optical fiber is left under a hygrothermal environment for a long time, and minimizing an increase in transmission loss at low temperatures.

The optical fiber according to one aspect of the present invention includes an optical transmission medium having a core and a cladding, a primary resin layer disposed in contact with the optical transmission medium to coat the optical transmission medium, and a secondary resin layer coating the primary resin layer, wherein a Young's modulus of the primary resin layer is 0.5 MPa or less at 23° C., and the primary resin layer comprises a cured product of an ultraviolet light curable resin composition containing a urethane (meth)acrylate oligomer, a monomer, a photopolymerization initiator and a β-diketone compound, and tin.

According to the present invention, an optical fiber having a low Young's modulus leading to high lateral pressure resistance, enabling prevention of the generation of voids even if the optical fiber is left under a hygrothermal environment for a long time, and minimizing an increase in transmission loss at low temperatures can be provided.

BRIEF DESCRIPTION OF THE DRAWINGS

FIG. 2A is a diagram illustrating a configuration of a metal mesh material used in a mesh lateral pressure test, and FIG. 2B is a partially enlarged view of a portion in FIG. 2A.

DETAILED DESCRIPTION

Figure 1:
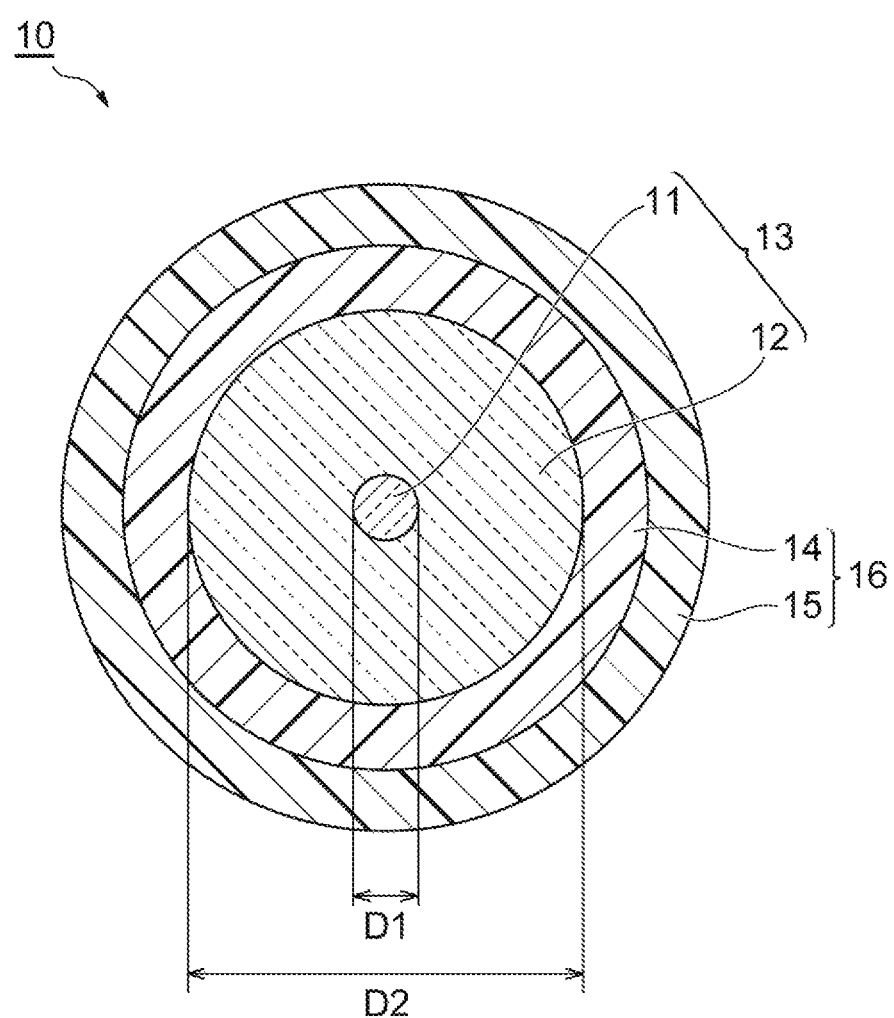
FIG. 1 is a schematic sectional view illustrating one example of the optical fiber according to the present embodiment.

Description of Embodiment According to the Present Invention

First, the content of the embodiment according to the present invention will be detailed and described. The optical fiber according to one aspect of the present invention includes an optical transmission medium having a core and a cladding, a primary resin layer disposed in contact with the optical transmission medium to coat the optical transmission medium, and a secondary resin layer coating the primary resin layer, wherein a Young's modulus of the primary resin layer is 0.5 MPa or less at 23° C., and the primary resin layer comprises a cured product of an ultraviolet light curable resin composition (hereinafter, also simply referred to as "resin composition") containing a urethane (meth)acrylate oligomer, a monomer, a photopolymerization initiator and a β-diketone compound, and tin.

Here, tin (Sn) contained in the primary resin layer is derived from an organic tin catalyst used when the urethane (meth)acrylate oligomer is synthesized.

Tin has an action to promote hydrolysis of urethane bond and ester bond. In contrast, the present inventors have found that by forming a primary resin layer using a resin composition containing the β-diketone compound, hydrolysis can be prevented even after the optical fiber is stored under a hygrothermal environment for a long time and no voids are generated in the resin layer, and have achieved the present invention. The present inventors infer the following factor to demonstrate such an effect.

The β-diketone compound has a β-diketone site represented by formula (1). It is considered that because tin is coordinated with the β-diketone site to form a complex represented by formula (2), for example, to suppress the catalyst activity of tin, the hydrolysis of urethane bond and ester bond is prevented.

(1)

(2)

Tin may be contained in the primary resin layer in an amount of about 10 to 1000 ppm. The synthetic rate can be increased and the productivity can be improved by use of the organic tin catalyst during synthesis of urethane (meth) acrylate.

The Young's modulus of the primary resin layer may be 0.25 MPa or less at 23° C. Thereby, higher lateral pressure resistance of the optical fiber can be ensured.

The β-diketone compound may be contained in an amount of 0.01 to 10 parts by mass relative to a total amount of 100 parts by mass of the resin composition. If the content of the β-diketone compound is 0.01 parts by mass or more, the effect of preventing hydrolysis is readily demonstrated; if the content is 10 parts by mass or less, the Young's modulus of the primary resin layer is readily controlled.

Moreover, the β-diketone compound may have a polymerizable group. Because the β-diketone compound having a polymerizable group is incorporated into crosslinking when the resin composition is cured, a reduction in the effect of preventing hydrolysis caused by volatilization of the β-diketone compound over time can be prevented.

Detailed Description of Embodiment According to the Present Invention

Hereinafter, specific examples of the optical fiber according to an embodiment of the present invention will be described with reference to the drawings. The present invention will not be limited to these examples, but is defined by WHAT IS CLAIMED IS and intended to include all modifications within the meaning and scope of equivalency of WHAT IS CLAIMED IS. In the following description, identical reference numbers will be given to identical components in the description of drawings, and the duplication of description will be omitted.

(Optical Fiber)

FIG. 1 is a schematic sectional view illustrating one example of the optical fiber according to one embodiment of the present invention. An optical fiber 10 includes an optical transmission medium 13 having a core 11 and a cladding 12, and a coating resin layer 16 having a primary resin layer 14 and a secondary resin layer 15, disposed on the outer periphery of the optical transmission medium 13.

The cladding 12 surrounds the core 11. The core 11 and the cladding 12 mainly contain glass such as silica glass; for example, a silica to which germanium is added can be used as the core 11, and pure silica or a silica to which fluorine is added can be used as the cladding 12.

In FIG. 1, for example, the outer diameter (D2) of the optical transmission medium 13 is about 125 μm. The diameter (D1) of the core 11 forming the optical transmission medium 13 is about 7 to 15 μm. The coating resin layer 16 has at least a two-layered structure including the primary resin layer 14 and the secondary resin layer 15. The total thickness of the coating resin layer 16 is usually about 60 μm; the thicknesses of the primary resin layer 14 and the secondary resin layer 15 are substantially identical and the thickness of each layer is about 20 to 40 μm. For example, the thickness of the primary resin layer 14 may be 35 μm and the thickness of the secondary resin layer 15 may be 25 μm.

The Young's modulus of the primary resin layer is 0.5 MPa or less at 23° C., more preferably 0.3 MPa or less, still more preferably 0.25 MPa or less. The lower limit value of the Young's modulus of the primary resin layer is not particularly limited, and is about 0.05 MPa. The Young's modulus of the primary resin layer can be measured by a pullout modulus test at 23° C.

By the way, a higher optical signal to noise ratio (OSNR) is required in the optical fiber to increase the channel capacity per core of a glass fiber by digital coherent communication techniques including multi-modulation technique. Examples of a method for improving the OSNR include a reduction in nonlinearity. For the reduction in nonlinearity, the effective cross-sectional area of the core of the glass fiber is increased as much as possible and low transmission loss is needed. However, the former, i.e., an increase in the effective cross-sectional area of the core means that the optical fiber becomes weak against lateral pressure. In particular, in the case where the effective cross-sectional area of the core exceeds 150 μm$^2$, it is preferable that the primary resin layer have a low Young's modulus of 0.25 MPa or less.

The primary resin layer 14 can be formed by curing an ultraviolet light curable resin composition containing a urethane (meth)acrylate oligomer, a monomer, a photopolymerization initiator, and a β-diketone compound.

In the primary resin layer 14, tin derived from an organic tin catalyst used in synthesis of the urethane (meth)acrylate oligomer described later is contained with the cured resin composition. The content of tin in the primary resin layer 14 is usually about 10 to 1000 ppm, and may be about 10 to 600 ppm. The content of tin can be determined by ICP (light emission analyzer using high frequency inductively coupled plasma as a light source) light emission analysis. Specifically, 20 mL of sulfuric acid and 6 mL of nitric acid are added to 1 g of a sample, and are heated for 10 minutes; then, 4 mL of perchloric acid is added, and is heated until insoluble substances disappear; then, 100 mL of the sample is measured, and can be measured by ICP.

Here, the term (meth)acrylate indicates acrylate or its corresponding methacrylate. The same is true of the term (meth)acrylic acid.

Examples of the urethane (meth)acrylate oligomer include those obtained by reacting a polyol compound, a polyisocyanate compound, and a hydroxyl group-containing (meth)acrylate compound. Examples of the polyol compound include polytetramethylene glycol, polypropylene glycol, and bisphenol A•ethylene oxide addition diol. Examples of the polyisocyanate compound include 2,4-tolylene diisocyanate, 2,6-tolylene diisocyanate, isophorone diisocyanate, and dicyclohexylmethane 4,4'-diisocyanate. Examples of the hydroxyl group-containing (meth)acrylate compound include 2-hydroxyethyl acrylate, 2-hydroxybutyl acrylate, 1,6-hexanediol monoacrylate, pentaerythritol triacrylate, 2-hydroxypropyl acrylate, and tripropylene glycol diacrylate.

An organic tin catalyst is used as a catalyst during synthesis of the urethane (meth)acrylate oligomer. Examples of the organic tin catalyst include dibutyltin dilaurate, dibutyltin diacetate, dibutyltin maleate, dibutyltin bis(2-ethylhexyl mercaptoacetate), dibutyltin bis(isooctyl mercaptoacetate), and dibutyltin oxide. From the viewpoint of availability and catalyst performance, it is preferable that dibutyltin dilaurate or dibutyltin diacetate be used.

A lower alcohol having 5 or less carbon atoms may be used during synthesis of the urethane (meth)acrylate oligomer. Examples of the lower alcohol having 5 or less carbon atoms used during synthesis of the urethane (meth) acrylate oligomer include methanol, ethanol, 1-propanol, 2-propanol, 1-butanol, 2-butanol, 2-methyl-2-propanol, 1-pentanol, 2-pentanol, 3-pentanol, 2-methyl-1-butanol, 3-methyl-1-butanol, 2-methyl-2-butanol, 3-methyl-2-butanol, and 2,2-dimethyl-1-propanol.

Hereinafter, preparation of the urethane (meth)acrylate oligomer will be described by reference to a specific example. For example, if polypropylene glycol as a polyol, isophorone diisocyanate as a polyisocyanate, 2-hydroxyethyl acrylate as a hydroxyl group-containing (meth)acrylate, and methanol as an alcohol are used, an urethane (meth)acrylate oligomer containing three reaction products shown below can be obtained:

  (1)

  (2)

  (3)

where H represents the residue of 2-hydroxyethyl acrylate, I represents the residue of isophorone diisocyanate, PPG represents the residue of polypropylene glycol, Me represents the residue of methanol, and n represents an integer of 1 or more.

The reaction product (1) is a both-ends reactive oligomer; therefore, the crosslinking density of the cured resin composition can be increased. The reaction product (2) is a one-end reactive oligomer; therefore, the reaction product (2) has the effect of reducing the crosslinking density of the cured resin composition, and can reduce the Young's modulus. The reaction product (3) is a non-reactive oligomer which causes no curing with ultraviolet light; therefore, it is preferable that preparation be performed such that the reaction product (3) is minimized.

When the urethane (meth)acrylate oligomer is synthesized, a silane coupling agent having a functional group reactive with the isocyanate group may be used. Examples of the silane coupling agent having a functional group reactive with the isocyanate group include N-2-(aminoethyl)-3-aminopropylmethyldimethoxysane, N-2-(aminoethyl)-3-aminopropyltrimethoxysilane, 3-aminopropyltrimethoxysilane, 3-aminopropyltriethoxysilane, 3-mercaptopropylmethyldimethoxysilane, and 3-mercaptopropyltrimethoxysilane. If the polyol compound is reacted with the isocyanate compound, the hydroxyl group-containing (meth)acrylate compound and the silane coupling agent are used in combination in the state where an isocyanate group is present on both ends, and are reacted with the isocyanate group, a both-ends reactive oligomer and additionally a one-end silane coupling agent addition oligomer can be synthesized. As a result, because the oligomer can be reacted with glass, the adhesion between the optical transmission medium 13 and the primary resin layer 14 can be enhanced.

As a monomer, a monofunctional monomer having one polymerizable group, or a polyfunctional monomer having two or more polymerizable groups can be used. These monomers may be used in the form of a mixture thereof.

Examples of the monofunctional monomer include (meth)acrylate monomers such as methyl (meth)acrylate, ethyl (meth)acrylate, propyl (meth)acrylate, n-butyl (meth)acrylate, s-butyl (meth)acrylate, t-butyl (meth)acrylate, isobutyl (meth)acrylate, n-pentyl (meth)acrylate, isopentyl (meth)acrylate, hexyl (meth)acrylate, heptyl (meth)acrylate, isoamyl (meth)acrylate, 2-ethylhexyl (meth)acrylate, n-octyl (meth)acrylate, isooctyl (meth)acrylate, isodecyl (meth)acrylate, lauryl (meth)acrylate, dicyclopentanyl (meth)acrylate, dicyclopentenyl (meth)acrylate, isobornyl (meth)acrylate, benzyl (meth)acrylate, phenoxyethyl (meth)acrylate, tetrahydrofurfuryl (meth)acrylate, dicyclopentenyloxyethyl (meth)acrylate, nonylphenol polyethylene glycol (meth)acrylate, and nonylphenoxypolyethylene glycol (meth)acrylate; carboxyl group-containing monomers such as (meth)acrylic acid, (meth)acrylic acid dimers, carboxyethyl (meth)acrylate, carboxypentyl (meth)acrylate, and ω-carboxy-polycaprolactone (meth)acrylate; heterocycle-containing (meth)acrylates such as 3-(3-pyridyl)propyl (meth)acrylate, N-acryloylmorpholine, N-vinylpyrrolidone, N-vinylcaprotactam, N-acryloylpiperidine, N-methacryloylpiperidine, and N-acryloylpyrrolidine; maleimide monomers such as maleimide, N-cyclohexylmaleimide, and N-phenylmaleimide; N-substituted amide monomers such as (meth)acrylamide, N,N-dimethyl(meth)acrylamide, N,N-diethyl(meth)acrylamide, N-hexyl(meth)acrylamide, N-methyl(meth)acrylamide, N-butyl(meth)acrylamide, N-butyl(meth)acrylamide, N-methylol(meth)acrylamide, and N-methylolpropane(meth)acrylamide; aminoalkyl (meth)acrylate monomers such as aminoethyl (meth)acrylate, aminopropyl (meth)acrylate, N,N-dimethylaminoethyl (meth)acrylate, and t-butylaminoethyl (meth)acrylate; and succinimide monomers such as N-(meth)acryloyloxymethylene succinimide, N-(meth)acryloyl-6-oxyhexamethylene succinimide, and N-(meth)acryloyl-8-oxyoctamethylene succinimide.

Examples of the polyfunctional monomer include ethylene glycol di(meth)acrylate, polyethylene glycol di(meth)acrylate, polypropylene glycol di(meth)acrylate, neopentyl glycol di(meth)acrylate, tripropylene glycol di(meth)acrylate, di(meth)acrylate of alkylene oxide adduct of bisphenol A, tetraethylene glycol di(meth)acrylate, hydroxy pivalic acid neopentyl glycol di(meth)acrylate, 1,4-butanediol di(meth)acrylate, 1,6-hexanediol di(meth)acrylate, 1,9-nonanediol di(meth)acrylate, 1,12-dodecanediol di(meth)acrylate, 1,14-tetradecanediol di(meth)acrylate, 1,16-hexadecanediol di(meth)acrylate, 1,20-eicosanediol di(meth)acrylate, isopentyl diol di(meth)acrylate, 3-ethyl-1,8-octanediol di(meth)acrylate, EO adducts di(meth)acrylate of bisphenol A; trimethylolpropane tri(meth)acrylate, trimethyloloctane tri(meth)acrylate, trimethylolpropanepolyethoxy tri(meth)acrylate, trimethylolpropanepolypropoxy tri(meth)acrylate, trimethylolpropanepolyethoxypolypropoxy tri(meth)acrylate, tris[(meth)acryloyloxyethyl] isocyanurate, pentaerythritol tri(meth)acrylate, pentaerythritolpolyethoxy tetra(meth)acrylate, pentaerythritolpolypropoxy tetra(meth)acrylate, pentaerythritol tetra(meth)acrylate, ditrimethylolpropane tetra(meth)acrylate, dipentaerythritol tetra(meth)acrylate, dipentaerythritol penta(meth)acrylate, dipentaerythritol hexa(meth)acrylate, and caprolactone-modfied tris[(meth)acryloyloxyethyl] isocyanurate.

The photopolymerization initiator can be appropriately selected from known radical photopolymerization initiators; examples thereof include 1-hydroxycyclohexylphenyl ketone, 2,2-dimethoxy-2-phenylacetophenone, 1-(4-isopropylphenyl)-2-hydroxy-2-methylpropan-1-one, 2,4,4-trimethylpentylphosphine oxide, 2,4,4-trimethylbenzoyldiphenylphosphine oxide, 2-methyl-1-[4-(methylthio)phenyl]-2-morpholino-propan-1-one (Irgacure 907, manufactured by BASF SE), 2,4,6-trimethylbenzoyldiphenylphosphine oxide (Irgacure TPO, manufactured by BASF SE), and bis(2,4,6-trimethylbenzoyl)phenylphosphine oxide (Irgacure 819, manufactured by BASF SE). These photopolymerization initiators may be used in the form of a mixture thereof.

The β-diketone compound is not particularly limited as long as it is a compound having a β-diketone site. The β-diketone compound may have a polymerizable group. In the present embodiment, the β-diketone compounds having a polymerizable group and β-diketone compounds having no polymerizable group can be both used; these compounds may be used singly or in the form of a mixture thereof.

Examples of the β-diketone compound include acetylacetone, acetoacetic acid, methyl acetoacetate, ethyl acetoacetate, allyl acetoacetate (allyl acetoacetate), 2-acetoacetoxyethyl (meth)acrylate, 2-acetoacetoxypropyl (meth)acrylate, 2-acetoacetoxybutyl (meth)acrylate, and 2,3-di(acetoacetoxy)propyl (meth)acrylate. Among these, β-diketone compounds having a polymerizable group, i.e., allyl acetoacetate, 2-acetoacetoxyethyl (meth)acrylate, 2-acetoacetoxypropyl (meth)acrylate, 2-acetoacetoxybutyl (meth)acrylate, and 2,3-di(acetoacetoxy)propyl (meth)acrylate are preferred. Because the β-diketone compound having a polymerizable group is incorporated into crosslinking of the resin composition, the β-diketone compound does not volatilize, and readily keeps the effect of preventing hydrolysis even in degradation for a long time.

The content of the β-diketone compound is preferably 0.01 to 1.0 parts by mass, more preferably 0.05 to 5 parts by mass, still more preferably 0.1 to 3 parts by mass relative to a total amount of 100 parts by mass of the resin composition forming the primary resin layer. If the content of the β-diketone compound is 0.01 parts by mass or more, the effect of preventing hydrolysis is readily demonstrated; if the content is 10 parts by mass or less, the Young's modulus is readily controlled.

The resin composition may further contain a silane coupling agent, a photo acid generator, a leveling agent, an antifoaming agent, or an antioxidant.

The silane coupling agent is not particularly limited as long as it does not obstruct curing of the ultraviolet light curable resin composition, and a variety of silane coupling agents including publicly known and used silane coupling agents can be used. Examples of the silane coupling agent include tetramethyl silicate, tetraethyl silicate, mercaptopropyltrimethoxysilane, vinyltrichlorosilane, vinyltriethoxysilane, vinyltris(β-methoxy-ethoxy)silane, β-(3,4-epoxycyclohexyl)-ethyltrimethoxysilane, dimethoxydimethylsilane, diethoxydimethylsilane, 3-acryloxypropyltrimethoxysilane, γ-glycidoxypropyltrimethoxysilane, γ-glycidoxypropylmethyldiethoxysilane, γ-methacryloxypropyltrimethoxysilane, N-(β-aminoethyl)-γ-aminopropyltrimethoxysilane, N-(β-aminoethyl)-γ-aminopropyltrimethyldimethoxysilane, N-phenyl-γ-aminopropyltrimethoxysilane, γ-chloropropyltrimethoxysilane, γ-mercaptopropyltrimethoxysilane, γ-aminopropyltrimethoxysilane, bis-[3-(triethoxysilyl)propyl]tetrasulfide, bis-[3-(triethoxysilyl)propyl]disulfide, γ-trimethoxysilylpropyldimethylthiocarbamyl tetrasulfide, and γ-trimethoxysilylpropylbenzothiazyl tetrasulfide. By use of the silane coupling agent, the adhesion between the optical transmission medium 13 and the primary resin layer 14 can be controlled, or dynamic fatigue properties can be improved.

As the photo acid generator, an onium salt having a structure represented by $A^+B^-$ may be used. Examples of the photo acid generator include sulfonium salts such as UVACURE 1590 (manufactured by DAICEL-CYTEC Company, Ltd.), and CPI-100P and 110P (manufactured by San-Apro Ltd.); and iodonium salts such as IRGACURE 250 (manufactured by BASF SE), WPI-113 (manufactured by Wako Pure Chemical Industries, Ltd.), and Rp-2074 (manufactured by Rhodia Japan, Ltd.).

The secondary resin layer 15 can be formed, for example, by curing an ultraviolet light curable resin composition comprising a urethane (meth)acrylate oligomer, a monomer, and a photopolymerization initiator. The urethane (meth)acrylate oligomer, the monomer, and the photopolymerization initiator can be appropriately selected from those listed in the resin composition forming the primary resin layer. The resin composition forming the secondary resin layer has a composition different from that of the resin composition forming the primary resin layer.

The Young's modulus of the secondary resin layer is preferably 500 to 1400 MPa at 23° C., more preferably 800 to 1300 MPa. If the Young's modulus of the secondary resin layer is 500 MPa or more, the lateral pressure resistance is readily improved; if the Young's modulus of the secondary resin layer is 1400 MPa or less, the secondary resin layer has appropriate elongation at break; therefore, the secondary resin layer is difficult to break during removal of the coating, and has high coating removing properties.

EXAMPLES

Hereinafter, the results of evaluation tests using Examples and Comparative Examples according to the present invention will be shown, and the present invention will be described more in detail. The present invention will not be limited to these Examples.

(Urethane (Meth)Acrylate Oligomer)

Urethane acrylate oligomer A was prepared by synthesis using polypropylene glycol having a molecular weight of 4000 as a polyol, isophorone diisocyanate as a polyisocyanate, 2-hydroxyethyl acrylate as a hydroxyl group-containing (meth)acrylate, and dibutyltin diacetate as an organic tin catalyst.

Urethane acrylate oligomer B was prepared by synthesis using polypropylene glycol having a molecular weight of 4000 as a polyol, isophorone diisocyanate as a polyisocyanate, 2-hydroxyethyl acrylate as a hydroxyl group-containing (meth)acrylate, methanol as an alcohol, and dibutyltin dilaurate as an organic tin catalyst.

Urethane acrylate oligomer C was prepared by synthesis using polypropylene glycol having a molecular weight of 1000 as a polyol, isophorone diisocyanate as a polyisocyanate, 2-hydroxyethyl acrylate as a hydroxyl group-containing (meth)acrylate, and dibutyltin dilaurate as an organic tin catalyst.

(Resin Composition for Primary Resin Layer)

Resin compositions for a primary resin layer having the compositions (parts by mass) shown in Tables 1 and 2 were each prepared.

(Resin Composition for Secondary Resin Layer)

60 parts by mass of urethane acrylate oligomer C as an oligomer, 19 parts by mass of isobornyl acrylate and 20 parts by mass of trimethylolpropane triacrylate as monomers, and 1 part by mass of Irgacure TPO as a photopolymerization initiator were mixed to prepare a resin composition for a secondary resin layer.

[Preparation of Optical Fiber 10]

A primary resin layer 14 having a thickness of 35 μm was formed using a resin composition for a primary resin layer having a composition shown in Table 1 or 2 on the outer periphery of an optical transmission medium 13 including a core and a cladding, and having an outer diameter of 125 μm and an effective cross-sectional area of the core of 150 μm$^2$; and a secondary resin layer 15 having a thickness of 25 μm was further formed on the outer periphery using the resin composition for a secondary resin layer to prepare an optical fiber 10.

[Evaluation of Optical Fiber 10]

The resulting optical fibers were subjected to the following evaluation tests. The results are shown in Tables 1 and 2.

(Young's Modulus of Primary Resin Layer)

The Young's modulus of the primary resin layer was measured by a pullout modulus test at 23° C. Specifically, a coating resin layer 16 of the optical fiber 10 was cut with a razor to cut out the coating resin layer 16, and the coating resin layer 16 (primary resin layer 14 and secondary resin layer 15) was fixed and the optical transmission medium 13 was pulled off. The stress of the primary resin layer 14 was determined from the amount of elastic deformation of the primary resin layer 14 before the optical transmission medium 13 was pulled out and the force pulling the optical transmission medium 13.

(Lateral Pressure Resistance)

The lateral pressure resistance of the optical fiber was evaluated by a lateral pressure test. FIG. 2A is a diagram illustrating the configuration of a metal mesh material 30 used in the lateral pressure test, and FIG. 2B is a partially enlarged view of the portion in FIG. 2A. As illustrated in FIGS. 2A and 2B, the metal mesh material 30 has a mesh shape composed of several metal wires extending horizontally and orthogonally. The diameter φ1 of the orthogonal wire and the diameter φ2 of the horizontal wire are 50 μm, the pitch P between center lines of orthogonal wires and that between center lines of horizontal lines are 150 μm. The projection length L1 of the orthogonal wire is 100 μm, and the projection length L2 of the horizontal line is 100 μm.

The lateral pressure test was performed by determining the difference between the transmission loss of signal light at a wavelength of 1550 nm when the optical fiber was wound around a bobbin (diameter of the body: 280 mm) having the metal mesh material 30 illustrated in FIGS. 2A and 2B wound around the body and the transmission loss when the optical fiber was loosely formed into a coil without wound around the bobbin. The optical fiber was ranked as A when the difference in transmission loss was less than 0.6 dB/km, as B when the difference was 0.6 or more and less than 1.0, and as C when the difference was 1.0 or more; a rank equal to B or higher was considered acceptable.

(Low Temperature Properties after Hygrothermal Degradation)

In the optical fibers degraded at 85° C. and 85% RH for 180 days, the transmission properties of signal light having a wavelength of 1550 nm were measured under two temperature conditions at 23° C. and −40° C. to determine the transmission loss at 23° C. and that at −40° C. The optical fiber was ranked as A if the difference in transmission loss obtained from subtracting the transmission loss at 23° C. from the transmission loss at −40° C. was less than 0 dB/km, as B if the difference was 0 dB/km or more and less than 0.01 dB/km, and as C if the difference was 0.01 dB/km or more. A rank equal to B or higher was considered acceptable.

TABLE 1

| Example | 1 | 2 | 3 | 5 | 6 | 7 | 8 | 9 |
|---|---|---|---|---|---|---|---|---|
| Urethane acrylate oligomer A | 70 | — | — | — | — | — | — | — |
| Urethane acrylate oligomer B | — | 68 | 69 | 70 | 70.5 | 70 | 71 | 60 |
| Isobornyl acrylate | 10 | 10 | 10 | 10 | 10 | 10 | 10 | 10 |
| N-Vinylcaprolactam | 10 | 10 | 10 | 10 | 10 | 10 | 10 | 10 |
| Nonylphenoxypolyethylene glycol acrylate | 6 | 6 | 6 | 6 | 6 | 6 | 6 | 6 |
| 1,6-Hexanediol acrylate | 1 | 3 | 2 | 1 | 0.5 | 1 | 1 | 1 |
| Irgacure TPO | 1 | 1 | 1 | 1 | 1 | 1 | 1 | 1 |
| Acetylacetone | — | — | — | — | — | 1 | — | — |
| 2-Acetoacetoxyethyl methacrylate | 1 | 1 | 1 | 1 | 1 | — | 0.05 | 10 |
| Mercaptopropyltrimethoxysilane | 1 | 1 | 1 | 1 | 1 | 1 | 1 | 1 |
| Young's modulus of primary resin layer (MPa) | 0.50 | 0.28 | 0.23 | 0.11 | 0.07 | 0.11 | 0.11 | 0.27 |
| Lateral pressure resistance (dB/km) | B | B | A | A | A | A | A | B |
| Low temperature properties after hygrothermal degradation (dB/km) | A | A | A | A | A | B | B | A |

TABLE 2

| Comparative Example | 1 | 2 | 3 | 5 | 6 | 7 | 8 |
|---|---|---|---|---|---|---|---|
| Urethane acrylate oligomer A | 70 | — | — | — | — | — | 69 |
| Urethane acrylate oligomer B | — | 68 | 69 | 70 | 70.5 | 70 | — |
| Isobornyl acrylate | 10 | 10 | 10 | 10 | 10 | 10 | 10 |
| N-Vinylcaprolactam | 10 | 10 | 10 | 10 | 10 | 10 | 10 |
| Nonylphenoxypolyethylene glycol acrylate | 6 | 6 | 6 | 6 | 6 | 6 | 6 |
| 1,6-Hexanediol acrylate | 1 | 3 | 2 | 1 | 0.5 | 1 | 2 |
| Irgacure TPO | 1 | 1 | 1 | 1 | 1 | 1 | 1 |
| Acetylacetone | — | — | — | — | — | — | — |
| 2-Acetoacetoxyethyl methacrylate | — | — | — | — | — | — | — |
| Mercaptopropyltrimethoxysilane | 1 | 1 | 1 | 1 | 1 | 1 | 1 |
| Young's modulus of primary resin layer (MPa) | 0.50 | 0.28 | 0.23 | 0.11 | 0.07 | 0.11 | 0.53 |
| Lateral pressure resistance (dB/km) | B | B | B | A | A | A | C |
| Low temperature properties after hygrothermal degradation (dB/km) | C | C | C | C | C | C | B |

It was able to be verified that the optical fibers prepared in the Examples had superior lateral pressure resistance and low temperature properties after hygrothermal degradation.

What is claimed is:

1. An optical fiber comprising:
    an optical transmission medium having a core and a cladding;
    a primary resin layer disposed in contact with the optical transmission medium to coat the optical transmission medium; and
    a secondary resin layer coating the primary resin layer,
    wherein a Young's modulus of the primary resin layer is 0.5 MPa or less at 23° C., and
    the primary resin layer comprises a cured product of an ultraviolet light curable resin composition containing a urethane (meth)acrylate oligomer, a monomer, a photopolymerization initiator and a β-diketone compound, and tin,
    wherein the β-diketone compound is a compound selected from acetylacetone, acetoacetic acid, 2-acetoacetoxypropyl (meth)acrylate, 2-acetoacetoxybutyl (meth)acrylate, and 2,3-di(acetoacetoxy)propyl (meth)acrylate.

2. The optical fiber according to claim 1, wherein 10 to 1000 ppm of the tin is contained in the primary resin layer.

3. The optical fiber according to claim 1, wherein the Young's modulus of the primary resin layer is 0.25 MPa or less at 23° C.

4. The optical fiber according to claim 1, wherein the β-diketone compound is contained in an amount of 0.01 to 10 parts by mass relative to a total amount of 100 parts by mass of the resin composition.

5. The optical fiber according to claim 1, wherein the β-diketone compound is a compound having a polymerizable group.

* * * * *